Patented Mar. 27, 1951

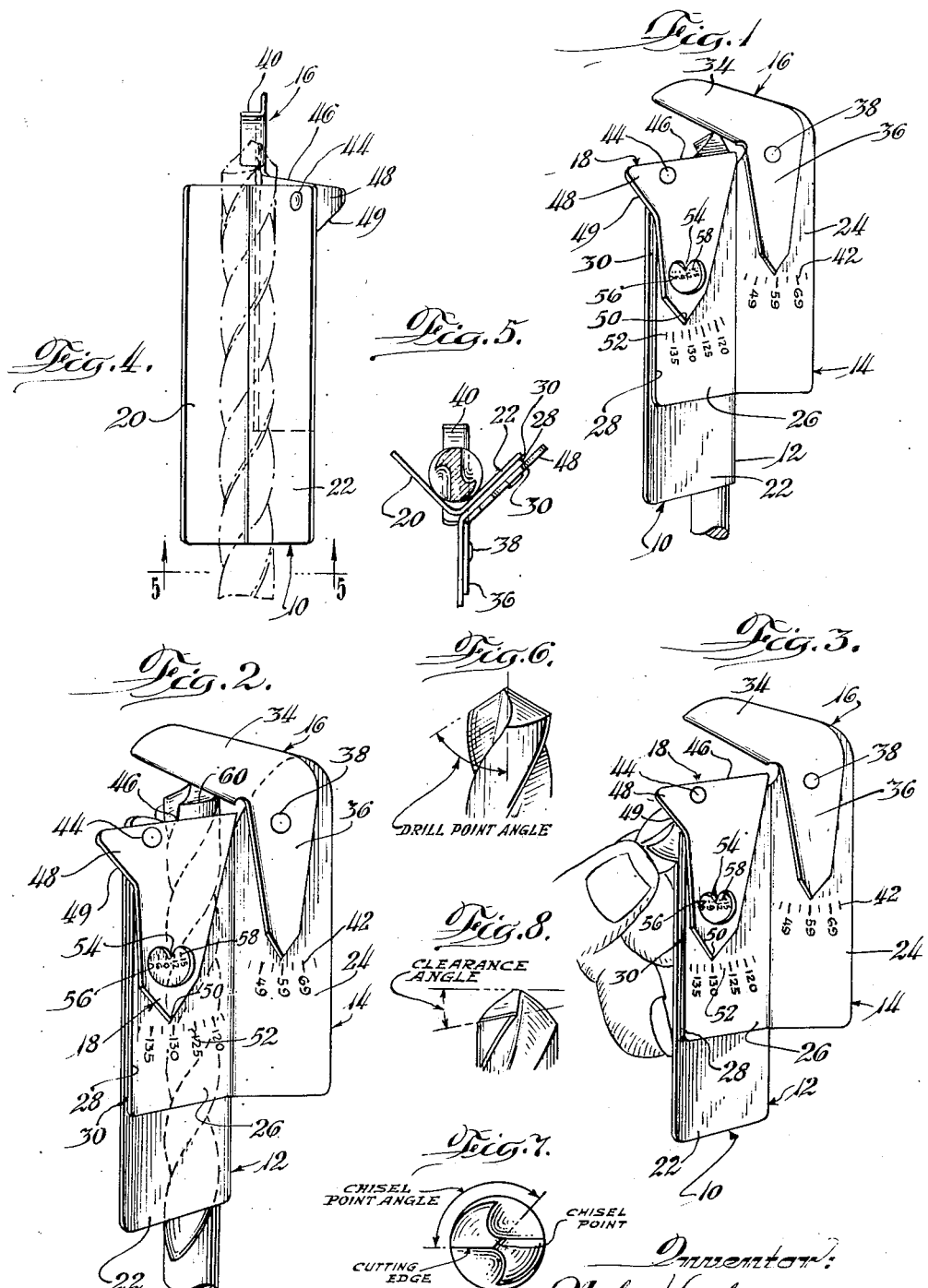

2,546,934

UNITED STATES PATENT OFFICE 2,546,934

TWIST DRILL GAUGE

Nels H. Swanson, Chicago, Ill.

Application July 7, 1949, Serial No. 103,414

10 Claims. (Cl. 33—201)

The present invention relates to twist drill gauges and more particularly to a gauge embodying adjustable means for gauging the several angles on the point of a twist drill.

The clearance angle, chisel point angle, and point angle of twist drills should be ground to definite angles which vary in accordance with the type of material the drills are designed to be used upon. For general all-around usefulness a twist drill gauge should include gauge members for gauging all these angles which are adjustable so that the gauge may be used for drills designed for drilling different kinds of materials.

Accordingly an object of the invention is to provide a new and improved twist drill gauge embodying gauge members for measuring all angles on the point of a twist drill, which gauge members are adjustable so that the gauge may be used to gauge twist drills of the varying angularities found in drills for drilling different kinds of materials.

Another object of the invention is the provision of a new and improved twist drill gauge which is adaptable for use on drills of a diameter varying within reasonable limits, and which is particularly adaptable for use on twist drills within the range of sizes most commonly used in home workshops.

A further object of the invention is the provision of a new and improved twist drill gauge having a body so constructed that twist drills may be firmly held in gauging position relative to the body of the gauge member manually and without the need for special clamping or holding means.

A still further object of the invention is the provision of a new and improved twist drill gauge which is exceedingly simple in construction and easy to use and which may be made from sheet metal stampings so that it is relatively inexpensive to construct but which nevertheless is accurate and entirely satisfactory in use.

These and other objects, advantages and capabilities of the invention will become apparent from the following description, reference being had to the accompanying drawings, in which:

Fig. 1 is a side elevational view of the improved gauge of the present invention showing it being used to gauge the clearance angle on the point of a twist drill;

Fig. 2 is a view similar to Fig. 1 on a slightly enlarged scale showing the gauge being used to gauge the point angle on a twist drill;

Fig. 3 is a view similar to Fig. 1 showing the gauge being used to gauge the chisel point angle on a twist drill;

Fig. 4 is an elevational view of the front or inner side of the gauge with a twist drill in phantom positioned therein;

Fig. 5 is an end view of the gauge taken in the direction of the arrows on line 5—5 of Fig. 4; and Figs. 6–8 are views showing the various angles on a drill point which may be gauged with the gauge of the present invention.

The gauge of the present invention comprises a body member 10 including a sheet metal stamping 12 in the form of an angle strip and a second stamping 14 secured to the angle strip, upon the facing sides of which a pair of stamped sheet metal gauge members 16 and 18 are mounted. Stamping 12 has longitudinally extending side walls or flanges 20 and 22 (Fig. 5) in substantially perpendicular planes while mounting member 14, which is somewhat shorter, has a pair of flanges 24 and 26 lying in planes defining an included angle of approximately 135°.

Flange 26 on the mounting member 14 is spot welded or otherwise suitably fixed to the outermost side of flange 22 with its longitudinal edge 28 parallel with but set back slightly from the edge on the flange 22, and with its flange 24 extending outwardly from the bight in angle strip 12 in a plane substantially bisecting the angle between flanges 20 and 22 on angle strip 12 (Fig. 5). By reason of this mounting of the stamping 14, a ledge 30 is formed along the lateral edge of the body of the gauge which constitutes one of the gauging surfaces of the gauge.

The upper end of flange 26 on the mounting member 14 coincides with the upper edge of the flange 22 on the angle strip. However, the upper end of flange 24 on this mounting member projects beyond the end of flange 26 to form a mounting for the gauge member 16.

Gauge member 16 which is used in gauging the point angle of a drill point is of generally bell crank shape and has a pair of arms 34 and 36. Intermediate its ends it is pivotally secured by means of a rivet 38 to the projecting part of the flange 24 on the mounting member 14. Arm 34 of this gauge member projects inwardly of the bight portion of the angle strip 12 in a plane substantially bisecting the angle between the flanges 20 and 22 and has an acutely inclined lower edge provided with an integral flange 40 (Fig. 4) in a plane substantially perpendicular to the plane of the arm 34. The other arm 36 of gauge member 16 forms a pointer to indicate upon a graduated scale 42 embossed in the flange 24 on mounting member 14. Since the point angles on drills for various types of materials vary between approximately 45° and 75°, scale 42 is marked off to indicate angles in this range.

The second gauge member 18 is pivotally secured adjacent the upper end of the body of the gauge by means of a rivet 44. Preferably the inner end of the rivet 44 is countersunk in the flange 22 on the angle strip 12 so that the inner side of the body member 10 is free of projections which might interfere with the proper positioning of a drill relative to the gauge. When the gauge member 18 is rocked to its outer limit, its top edge 46 lies substantially in the plane of the upper end of the flanges 20 and 22 on the angle strip 12. Adjacent its upper end an outwardly projecting ear 48 is provided along the outer edge of gauge member 18. This ear has an edge 49 inclined at an obtuse angle to the ledge 30 at all positions of adjustment of gauge member 18.

Gauge member 18 has a pointer 50 on its lower end which indicates on a graduated scale 52 embossed in the flange 26 on mounting member 14. This scale is marked off to indicate angles from approximately 120° to 135° and is used to measure the chisel point angle of a drill, the variation in degrees between the chisel point angles of drills for various purposes lying in this range.

A second pointer 54 is formed in a stamped-out portion 56 intermediate the ends of gauge member 18. This pointer indicates on a second graduated scale 58, also embossed in the flange 26 on stamping 14. This scale, which is used in measuring the clearance angle of a drill is marked off in angles running from approximately 6° to 15°. The variation in clearance angles on drills for various purposes normally falls within this range.

In order to clarify the manner in which the gauge is used, and the various angles on a twist drill which may be measured by this gauge, these angles have been shown and labeled on the portion of a drill point disclosed in Figs. 6, 7 and 8.

In gauging the point angle, the pointer on the end of arm 35 on gauge member 16 is set at the angle to which it is desired to grind the cutting edge of a drill, for example, at 59°. The drill to be ground is then pressed against the inner sides of the flanges 20 and 22 on body member 10 (Figs. 2 and 5) with the thumb of the user's left hand while the first two fingers of this hand extend around the back side of body member 10 and are pressed against the outer edge of flange 24. As a result, the axis of the drill will be at a fixed position relative to the body member 10. With the drill held in this position it is rotated and moved axially with the right hand until one of its cutting edges lies in a plane substantially parallel with the edge of gauging flange 40 on gauge member 16 and is in contact with this gauging surface. By viewing the gauging surface 40 against a light, it can be determined whether or not more grinding is required and which parts of the cutting edge require grinding. This same process may be repeated for the second cutting edge of the drill. Movement of the gauge members 16 and 18 is restrained sufficiently by the tightness of rivets 38 and 44 to prevent accidental movement of these gauge members from a set position while a drill point is being gauged.

With the drill and gauge in the position mentioned above, it is possible to determine whether the drill point has been ground to the proper clearance angle while the drill is in the same position relative to the gauge. To do this, the left hand is turned slightly so as to bring the upper edge 46 of the gauge member 18 directly into the line of vision of the operator. The line indicated at 60 in Fig. 2, which line determines the clearance angle of the drill point, will then be readily visible, and, if it is parallel with the top edge 46 of gauge member 18 and this gauge member has previously been set to the proper clearance angle, then the user will know that he is grinding the drill at the proper clearance angle.

A fairly accurate reading may be secured in this way, but a more accurate reading will be obtained if the drill is lowered relative to the body member 10 far enough to bring edge 60 substantially to the level of the upper edge 46 of the gauge member 18. By sighting across this upper edge toward the edge 60 on the drill point, a very accurate determination of the clearance angle of the drill point can be made. Since this method of gauging the clearance angle is more accurate, it is preferred.

In gauging the chisel point angle of a drill, the scale 52 and pointer 50 on the lower edge of gauge member 18 are used and the body member 10 preferably is held in the right hand in such a manner that the gauge member 18 may be manipulated with the thumb if desired, although ordinarily in gauging the chisel point angle of a drill the gauge member 18 will first be set at the proper position. One of the cutting edges of the drill is then placed upon the ledge 30 formed along the lateral edge of the body member 10. This brings the chisel point of the drill into a position facing the inclined edge 49 on the gauge member 18. The drill may then be moved to bring the chisel point against this inclined edge and, by viewing the gauge preferably against a light, it can be determined whether the chisel point on the drill lines up with the inclined edge 49 and thus whether the drill point has been ground to the desired chisel point angle.

The use of the gauge in grinding the points of drills to particular angles has been described above. When used for this purpose, the gauge members 16 and 18 are preset at the angles desired. However, the gauge may also be used to measure the angles on a drill point where these are unknown, in which case the gauge members and drill are moved relatively until the gauging surfaces and the edges to be measured on the drill are brought into register. The angles of these edges may then be read on the proper scales.

From the above description of the construction and operation of the gauge, its simplicity and ease of operation will be apparent. This simplicity is secured in part by the construction of the body in which the stamping 14 forms a mounting for gauge member 16 and also cooperates with the angle stamping 12 to define the ledge 30 which forms one of the gauging surfaces. Furthermore the gauge members 16 and 18 are so arranged on the body member 10 that a good estimate of the clearance angle of the drill point can be made when the drill is in position to have its point angle gauged. Moreover, the gauge member 18 not only has an edge 46 for gauging the clearance angle of the drill point but also has an inclined edge 49 on the ear 48 cooperating with the ledge 30 on body member 10 in gauging the chisel point angle of a drill.

While I have shown and described a preferred embodiment of my invention, it will be apparent that numerous variations and modifications thereof may be made without departing from the underlying principles of the invention. I, therefore, desire, by the following claims, to include within the scope of the invention all such variations and modifications by which substantially the results of my invention may be obtained through the use of substantially the same or equivalent means.

I claim:

1. A device for gauging twist drills comprising a body member having elongated angularly disposed side wall structure adapted to cooperate with the periphery of a drill pressed against the same to hold the drill in gauging relation with the body, means forming a flange extending outwardly of the side wall structure, means forming a ledge along one side of said wall structure, an adjustable first gauge member secured to said outwardly extending flange having a gauging surface for gauging the point angle of a drill positioned against said side wall structure extending across the axis of said drill at an acute angle thereto, a second adjustable gauge member secured on the outer side of said side wall structure and having a gauging surface along one end thereof for gauging the clearance angle of a drill in gauging position relative to said body member and a second gauging surface on the outer edge thereof to cooperate with said ledge in gauging the chisel point angle of a drill, the cutting edge of which is engaged upon the ledge, and cooperating means on said body member and on said gauge members to indicate the angles gauged by said gauging surface.

2. A device for gauging twist drills comprising a body member having elongated side walls disposed at an angle and adapted to cooperate with the periphery of a drill pressed against the same to hold the axis of a drill at a fixed position relative to said body, a mounting member having a first flange secured in superposed relation to the outer side of one of said side walls, said flange having a lateral edge parallel to the lateral edge of the said side wall and offset from end to end relative thereto to define a ledge, and a second flange on said mounting member extending outwardly of said side wall structure, a first gauge member on the outwardly extending flange for gauging the cutting edge of a drill having its axis at the said fixed position, a second gauge member on the outer side of the other flange of said mounting member having a gauging surface along one end thereof for gauging the clearance angle of a drill having its axis at the said fixed position, and a second gauging surface on the outer edge thereof to cooperate with the ledge in gauging the chisel point angle of a drill, the cutting edge of which is engaged upon said ledge, and cooperating means on the inwardly facing sides of the two flanges on the mounting member and on said gauge members to indicate the angles gauged by said gauging surfaces.

3. A device for gauging twist drills comprising a body member including an elongated angle strip, the inwardly facing sides of which are adapted to cooperate with the periphery of a drill pressed against the same to hold the drill in gauging relation with the body, a mounting member having a flange extending outwardly of the bight of said angle strip in a plane bisecting the angle between the sides thereof and a flange adapted to be secured in superposed relation to the outer side of one flange on said angle strip for securing the mounting member thereto, the lateral edge of said second flange of the mounting member lying parallel to the lateral edge of the flange on said angle strip to which it is secured and being offset therefrom to define a ledge, a first gauge member pivotally secured to said outwardly extending flange having a gauging surface for gauging the cutting edge of a drill disposed in gauging relation to said body, a second gauge member on the outer side of the mounting flange of said mounting member pivotable relative to said body member and having a gauging surface along one end thereof for gauging the clearance angle of a drill in position to have its cutting edge gauged, and a second gauging surface on the outer edge thereof to cooperate with the ledge in gauging the chisel point angle of a drill the cutting edge of which is engaged upon said ledge, and cooperating means on the mounting member and on said gauge members to indicate in degrees the angles gauged by said gauging surfaces.

4. A device for gauging twist drills comprising a body member having elongated flat angularly disposed side walls to cooperate with the sides of a drill to be gauged for maintaining the axis of said drill in a fixed position relative to said body member, a gauge member pivotally secured to the outermost side of one of the side walls of said body and having a first gauging surface in a plane parallel to said one side wall and extending beyond one end of the same for gauging the clearance angle of a drill at gauging position, a first graduated scale on the outermost side of said one side wall, a first pointer on said gauge member to register on the scale the clearance angle gauged by said first gauge surface, means forming a ledge along the lateral edge of the said one side wall of said body member to receive the cutting edge of a drill for locating the chisel point of the drill for gauging, a second gauging surface on said gauge member disposed at an obtuse angle to said ledge at all positions of the gauge member for gauging the chisel point angle of a drill held in gauging relation thereto, a second graduated scale on the outermost side of said one side wall, and a second pointer on said gauge member to register on the second scale the chisel point angle of said drill.

5. A device for gauging twist drills comprising a body member having wall structure to cooperate with the sides of a drill to be gauged for maintaining the axis of said drill in a fixed position relative to said body member, a gauge member pivotally secured to said body member and having a first gauging surface for gauging the clearance angle of a drill in gauging position, a first graduated scale on said body member, a first pointer on said gauge member to register on the scale the clearance angle gauged by said first gauge surface, means forming a gauging surface on said body member to receive the cutting edge of a drill for locating the chisel point of said drill for gauging, a second gauging surface on said gauge member disposed at an obtuse angle to the gauging surface on said body member at all positions of the gauge member for gauging the chisel point angle of a drill held in gauging relation with said gauging surfaces, a second graduated scale on said body member, and a second pointer on said gauge member to register on the second scale the chisel point angle of said drill.

6. A device for gauging twist drills comprising a body member having elongated side wall structure to cooperate with the periphery of a drill for maintaining the axis thereof at a fixed position relative to the body member when the drill is pressed against said wall structure, a first gauge member adjustably secured to the body member having a gauging surface beyond one end of said body extending across the axis of a drill positioned against said wall structure at an acute angle to said axis, said drill, body member and gauge member being relatively adjustable to bring a cutting edge of said drill and said surface into gauging relation, a second gauge member adjustably secured to said body member and having a gauging surface along one end thereof brought into gauging relation with the clearance angle of the drill by relative movement of the drill, body member and gauge member, means on the body member and first and second gauge members for indicating respectively the point angle and clearance angle of the point of said drill, means forming cooperating gauging surfaces on said body member and a lateral edge of the second of said gauge members adapted to be registered with the cutting edge and chisel point of a drill brought into gauging position relative thereto by relative movement of said drill, body member and gauge member, and means to indicate the chisel point angle of said drill when said cooperating gauging surfaces are registered with the drill.

7. A device for gauging twist drills comprising a body member including wall structure for cooperating with the periphery of a drill pressed against the same to maintain the axis of the drill in fixed position relative to said body member while the point angle and clearance angle of said drill are being gauged, a pair of gauge members pivotally secured to said body member, a gauging surface on the first gauge member for gauging the cutting edge of the drill at gauging position, a first gauging surface on said second gauge member for gauging the clearance angle of a drill in gauging position, means on the body member and first and second gauge members for indicating respectively the point and clearance angles gauged by said two gauge members, means forming a projecting edge along one side of said body member to receive the cutting edge of a drill for positioning its chisel point for gauging, a gauge surface on said second gauge member disposed at an obtuse angle to said projecting edge at all positions of the gauge member for gauging the chisel point angle of a drill in gauging position on said edge, and a graduated scale on said body member and a pointer on said second gauge member to indicate on said scale the chisel point angle of said drill.

8. A device for gauging twist drills comprising a body member having elongated flat angularly disposed sides to cooperate with the side of a drill to be gauged for maintaining the axis thereof in a fixed position relative to said body member, a gauge member pivotally secured adjacent one end of said body member and having a gauging surface extending at an acute angle to the axis of said drill over the space between said sides in a plane substantially bisecting the angle therebetween, said gauge member, body member and drill being relatively movable to bring said gauging surface into gauging relation with a cutting edge of said drill, a second gauge member pivotally secured to said body and having a gauging surface in a plane parallel with the plane of one of said sides and below said first mentioned gauge surface for gauging the clearance angle of a drill held in position for gauging its cutting edge, cooperating means including graduated scales on said body member and pointers on said gauge members respectively to indicate on said scales the angles gauged by said gauging surfaces, cooperating gauging surfaces including a gauging surface along one side edge of said body member and a gauging surface on said second gauge member disposed at an obtuse angle to said edge at all positions of the gauge member for gauging the chisel point angle of a drill held in gauging relation to said gauging surfaces, and means including a third graduated scale on said body member, and an additional pointer on said second gauge member to indicate the chisel point angle on said third scale.

9. A device for gauging twist drills comprising a body member having wall structure against which the periphery of a drill may be pressed to maintain the body and drill in gauging relation while the point angle and clearance angle of said drill are being gauged, a pair of gauge members secured to said body member, a gauging surface on the first gauge member to gauge the cutting edge of a drill in gauging position relative to the body, a first gauging surface on the second gauge member for gauging the clearance angle of said drill, cooperating surfaces for gauging the chisel point angle of a drill including a gauging surface on the body and a second gauging surface on the second gauge member adjustable relative to the gauging surface on the body member by pivotal movement of said second gauge member, and means including three graduated scales on said body member, one pointer on said first gauge member and two pointers on said second gauge member to indicate on said scales the angles gauged by said gauge members.

10. A twist drill gauge, comprising a sheet metal angle guide forming a V-shaped channel to receive a twist drill for gauging its point and clearance angles, the guide having a pair of legs terminating in longitudinal edges and intersecting at an apex, a sheet metal bracket secured to the guide having a leg extending outwardly from the apex of the guide approximately to bisect the exterior angle defined by the guide, a point angle gauge lever pivoted on the leg of the bracket having an upper arm extending inwardly over one end of the guide to register with the point angle of a drill and having a lower pointer arm for indicating the point angle, the bracket leg having an angular scale adjacent the pointer arm, a second sheet metal lever pivoted on the angle guide adjacent its upper end for measuring the clearance and chisel point angles of a drill, the second lever having a transverse edge protruding beyond the upper end of the angle guide to register with the clearance angle of a drill positioned for gauging its point angle, the second lever having a second edge protruding beyond a longitudinal edge of the angle guide at an adjustable obtuse angle for gauging the chisel point angle of a drill positioned with a cutting edge aligned with the longitudinal edge of the guide, the second lever having a downwardly extending arm terminating in a first pointer and having an aperture shaped to provide a second pointer, and a pair of scales being provided on the angle guide adjacent the second gauge lever pointers, one of the pointers on the second lever indicating the clearance angle and the other indicating the chisel point angle.

NELS H. SWANSON.

REFERENCES CITED

The following references are of record in the file of this patent:

UNITED STATES PATENTS

| Number | Name | Date |
|---|---|---|
| 609,895 | Mitchell | Aug. 30, 1898 |
| 2,301,256 | Conners | Nov. 10, 1942 |
| 2,337,819 | Hofmann | Dec. 28, 1943 |
| 2,377,715 | Poncelet | June 5, 1945 |

FOREIGN PATENTS

| Number | Country | Date |
|---|---|---|
| 606,459 | Great Britain | Aug. 13, 1948 |